US012771675B2

(12) United States Patent
Sharma et al.

(10) Patent No.: US 12,771,675 B2
(45) Date of Patent: Oct. 20, 2026

(54) UNIQUE INITIALIZATION VECTORS FOR SECURE COMMUNICATION OVER MULTIPATH NETWORKS

(71) Applicant: Cisco Technology, Inc., San Jose, CA (US)

(72) Inventors: Govind Prasad Sharma, Union City, CA (US); Prabhu Balakannan, Milpitas, CA (US); Wanli Wu, Sunnyvale, CA (US); Scott Roy Fluhrer, North Attleboro, MA (US); Sivakumar Kailas, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 214 days.

(21) Appl. No.: 18/621,672

(22) Filed: Mar. 29, 2024

(65) Prior Publication Data

US 2025/0310311 A1 Oct. 2, 2025

(51) Int. Cl.
*H04L 9/40* (2022.01)

(52) U.S. Cl.
CPC ................................ *H04L 63/0485* (2013.01)

(58) Field of Classification Search
CPC .................................................. H04L 63/0485
USPC .......................................................... 713/160
See application file for complete search history.

(56) References Cited

U.S. PATENT DOCUMENTS

| | | | | |
|---|---|---|---|---|
| 11,303,619 | B2 * | 4/2022 | Wang | G06F 9/45558 |
| 2008/0044012 | A1 | 2/2008 | Ekberg | |
| 2009/0262937 | A1 | 10/2009 | Hirth | |
| 2014/0025945 | A1 | 1/2014 | Mcgrew | |
| 2017/0171169 | A1 * | 6/2017 | Lee | H04W 12/033 |
| 2020/0358750 | A1 * | 11/2020 | Sharma | H04L 69/22 |
| 2022/0029800 | A1 | 1/2022 | Sergeev | |
| 2024/0129080 | A1 * | 4/2024 | Baldi | H04L 9/0618 |
| 2025/0150904 | A1 * | 5/2025 | Monajemi | H04W 36/023 |

* cited by examiner

*Primary Examiner* — Michael S McNally
(74) *Attorney, Agent, or Firm* — Lee & Hayes, P.C.

(57) ABSTRACT

Techniques described herein can allocate respective unique secure channel identifiers (SCIs) to respective uplink encryptor interfaces which provide intersite connectivity over multipathing internet protocol (IP) networks between a first data center site and a second data center site. A respective uplink encryptor interface can then use the unique SCI allocated thereto, along with a packet number counter value to encrypt and generate an integrity check value for at least a portion of a packet. The encryption can comprise using the SCI and the packet number counter value to generate a unique packet initialization vector for the packet, which is then used to encrypt and integrity protect the packet. The respective uplink encryptor interface can send the encrypted packet via a tunnel to a second data center site via a secure communication channel spanning across multiple encryptors and multiple decryptors. The encrypted packet can be decrypted at the second data center site and forwarded along to its destination within the second data center site.

20 Claims, 9 Drawing Sheets

UNIQUE INITIALIZATION VECTORS FOR SECURE COMMUNICATION OVER MULTIPATH NETWORKS

TECHNICAL FIELD

The present disclosure relates generally to computing network communications, and to communications between devices located at different data centers in particular.

BACKGROUND

Today's companies, government agencies, universities, and other entities may use computing resources that are located at multiple data centers. The data centers may be geographically distributed and may be connected, e.g., via the public Internet or other network connections. In such multisite deployment scenarios, secure communications can be transmitted between the computing resources at each data center, thereby enabling effective cooperation of the computing resources.

In an example arrangement, a first "fabric" at a first data center site may include a first "leaf" layer comprising multiple first leaf nodes, and a first "spine" layer comprising a first spine node. The first leaf nodes can handle communications involving one or more first virtual machines (VMs) or other computing resources. The first leaf nodes can send data to the first spine node, and the first spine node can be responsible for generating encrypted internet protocol (IP) packets and sending the IP packets to a second spine node at a second data center site if the destination is reachable via the second datacenter. The second spine node can decrypt the IP packets and distribute them to second leaf nodes within a second fabric at the second data center site. The second leaf nodes can handle communications involving one or more second VMs or other computing resources.

The above example arrangement works well so long as the first and second spine nodes are in one-to-one communication, which allows for deterministic sequencing of IP packets. However, as the communication volume increases, it is desirable to support multipath communications, e.g., communications between multiple first spine nodes at the first data center site and multiple second spine nodes at the second data center site. The extension to multipath communications is not straightforward, in part because encryption technologies impose requirements for unique identification of IP packets which are sent from a first datacenter to a second datacenter in order to ensure security and accurate decryption. In view of the above, techniques are needed to support secure multipath communications between nodes at data center sites.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
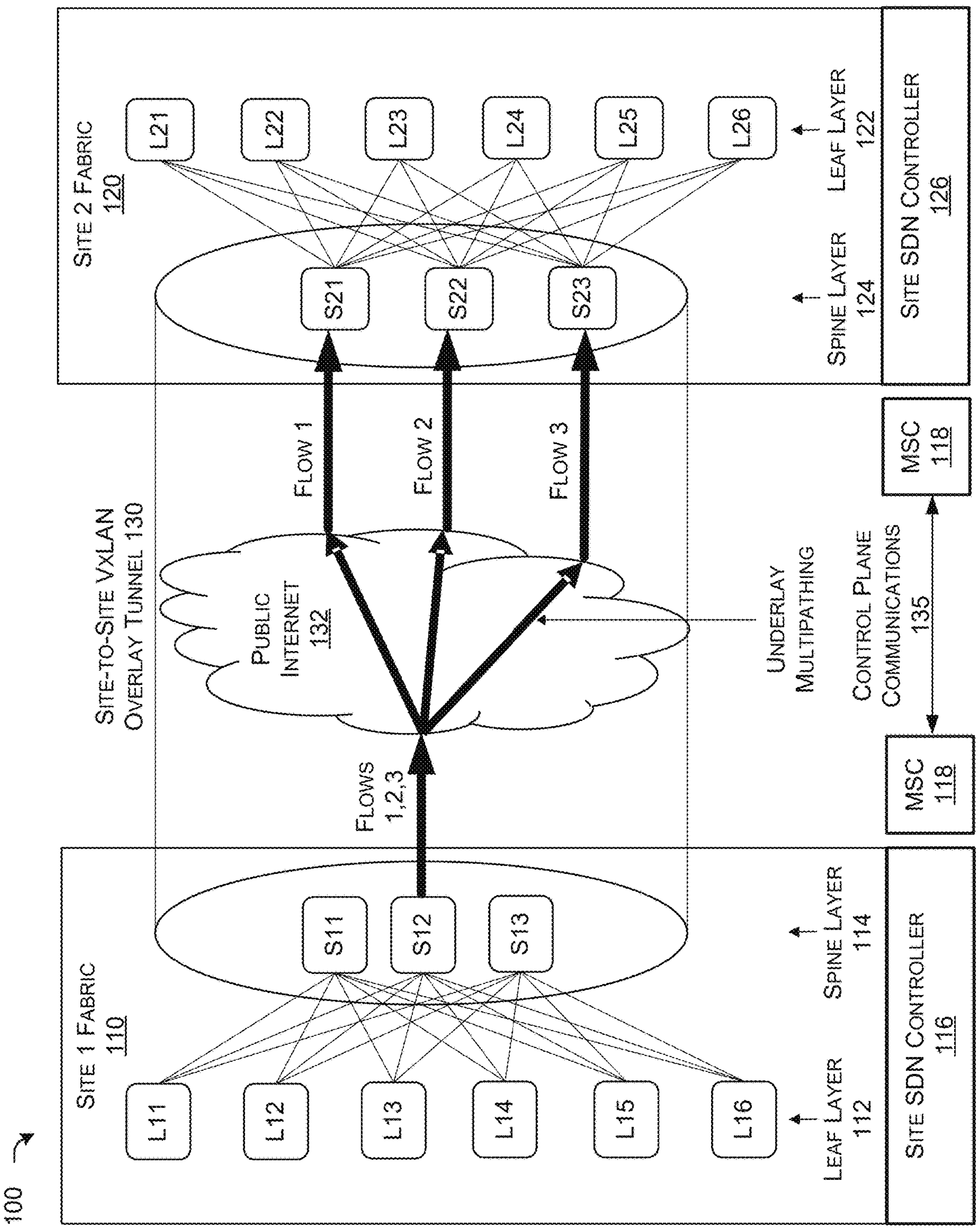
FIG. 1 illustrates first example multipath communications between devices of a first datacenter and devices of a second datacenter, in accordance with various aspects of the technologies disclosed herein.

This disclosure describes techniques that can be performed in connection with generating and using unique initialization vectors in multipath networks, as packet identifiers to provide per packet uniqueness in a secure channel. Example techniques can include allocating, at a first data center site, respective unique secure channel identifiers (SCIs) to respective uplink encryptor interfaces, each of which provides intersite connectivity to a second data center site. The respective unique SCIs can comprise respective unique upstream encryptor identifiers, optionally in addition to other identifiers as described herein.

An uplink encryptor interface (of the uplink encryptor interfaces to which unique SCIs are allocated) can then use the unique SCI allocated thereto, along with a packet number counter value which can optionally be maintained on a per encryptor interface basis, to encrypt at least a portion of a packet, resulting in an encrypted packet. The SCI and packet number counter value can be used to generate a unique packet initialization vector for the packet, and the unique packet initialization vector can be used to encrypt the packet.

The uplink encryptor interface can include the unique SCI and the packet number counter value in a header of the encrypted packet, and the uplink encryptor interface can then send the encrypted packet and the header via a tunnel and multipathing IP network to the second data center site. Because the encrypted packet was encrypted using the unique packet initialization vector, decryption at the second data center site can be accomplished without a risk of corruption or malfunction due to potentially missing, redundant, or out of sequence packet numbers.

The techniques described herein may be performed by one or more computing devices comprising one or more processors and one or more computer-readable media storing computer-executable instructions that, when executed by the one or more processors, cause the one or more processors to perform the methods disclosed herein. The techniques described herein may also be accomplished using non-transitory computer-readable media storing computer-executable instructions that, when executed by one or more processors, perform the methods carried out by the network controller device.

EXAMPLE EMBODIMENTS

In an example according to this disclosure, a first data center site can allocate respective unique secure channel identifiers (SCIs) to respective uplink encryptor interfaces which provide intersite connectivity to a second data center site. A respective uplink encryptor interface can then use the unique SCI allocated thereto, along with a packet number counter value to encrypt at least a portion of a packet. The encryption can comprise using the SCI and the packet number counter value to generate a unique packet initialization vector for the packet, which is then used to encrypt the packet. The respective uplink encryptor interface can include the unique SCI and the packet number counter value in a header of the encrypted packet, and the respective uplink encryptor interface can then send the encrypted packet and the header via a tunnel to a second data center site. The encrypted packet can be decrypted at the second data center site and forwarded along to its destination within the second data center site.

An example technical environment in which embodiments of this disclosure can be implemented is a cloud security (CloudSec) environment. It should be understood, however, that embodiments may also be practiced in other environments. CloudSec technology provides data security and integrity for inter datacenter site traffic using the cryptographic machinery of, e.g., the Institute of Electrical and Electronics Engineers (IEEE) media access control security (MACSec) standard for user datagram protocol (UDP packets), such as virtually extensible local area network (VxLAN) packets.

In an example CloudSec environment, an upstream device inserts a CloudSec header in a UDP payload of a VxLAN tunnel and does encryption of a VxLAN packet payload on transmission to a remote site using a locally generated symmetric cryptography key. A downstream device interprets the CloudSec header and does the decryption of the VxLAN packet payload using a remote site generated symmetric cryptography key. The downstream device is located at a downstream site that includes a datacenter fabric which receives encrypted packets and decrypts them.

A security association key (SAK) is a cryptography key used in a CloudSec data plane to encrypt traffic at a transmit device and decrypt the encrypted traffic at the receiving device. A transmit (TX) key is a SAK used to encrypt a clear VxLAN packet payload. A receive (RX) key is a SAK used to decrypt the encrypted VxLAN packet payload.

An association number (AN) is a unique identifier (e.g., a two-bit identifier) of a SAK within a security association channel. This identifier can be inserted as part of the CloudSec header in encrypted packets in the data plane and can be used to derive the RX key for decryption at the downstream device.

A secure channel identifier (SCI) is an identifier associated with a secure association channel. A secure association channel can comprise a unidirectional secure channel in a data plane which is used to transport data traffic between a set of network sites/devices that share a same set of the cryptography attributes such as SCI and SAK used for encryption and decryption of the data traffic. In an example, a SCI can comprise a unique 64-bit identifier for a unidirectional secure association channel setup between participating CloudSec devices. The SCI can be inserted as part of a CloudSec header in encrypted packets in a data plane and can be used in the to derive an RX key for decryption at a downstream device in association with the AN.

Symmetric keys are groups of related cryptography keys that can include a TX key to encrypt a packet stream by an upstream device, and an RX key to decrypt the packet stream at a downstream device. A rekey is a process initiated by the upstream site to replace a symmetric key by replacing a TX key with a newer TX key after the lifetime of the old TX key expires, and furthermore replacing RX keys used at downstream sites.

A site software defined network (SDN) controller, such as, for example, an application policy infrastructure controller (APIC) is a controller responsible for managing and monitoring operations of a datacenter fabric of a local site in a cloud. A multisite controller (MSC) is a SDN controller that is responsible for interconnecting multiple site SDN controllers in a management plane. The MSC can also be responsible for managing and monitoring intersite configurations and operations.

An integrity checksum value (ICV) is a checksum that can be appended to a packet by an encryptor after encrypting the packet and sending it to a decryptor. The ICV can be used at the decryptor to validate the integrity of the packet.

An inter site network (ISN) is an external public network that provides connectivity between remote datacenter sites, e.g., between a first datacenter site, a second datacenter site, and any further additional datacenter sites.

CloudSec technology can provide a way to achieve data security and integrity within, e.g., application centric infrastructure (ACI) type multisite deployments using the underlying cryptographic machinery of IEEE CloudSec for UDP packets such as VxLAN packets, as the packets traverse between datacenter sites. By using the CloudSec mechanisms for CloudSec, data centers can achieve cost effective encryption and data integrity checking that can run a line rate using industry standard algorithms.

CloudSec technology uses advanced encryption standard (AES) encryption standards for encryption. The AES standards require encryption engines to use a per packet level unique initialization vector (IV) as input to the encryption algorithm, in addition to the encryption key, in order to encrypt and decrypt data within a secure channel. To achieve this, the upstream encryption engines can locally maintain next packet number (PN) counters per security association (SA). An SA is a subchannel identified by an association number (AN) within a secure channel setup between an upstream and a downstream peer site.

In CloudSec, the PN in combination with the SCI can be used to construct a 96 bit IV to achieve per packet level uniqueness. The SCI can be a 64-bit value that identifies the secure channel between a pair of sites and can be used to associate the RX SA and TX SA information and associated SAK used by encryption and decryption engines.

The 96 bit IV and a symmetric SAK can be used by an encryption engine to encrypt, generate and assign a per packet ICV to an encrypted packet. Both the PN and SCI can be carried as part of the CloudSec header that carries packet metadata from the encryption engine to a decryption engine. The ICV can be appended at the end of an encrypted packet and can be used for integrity protection by the decryption engine.

When decryption engines receive encrypted packets, they can use the SCI and AN from a packet header to lookup a corresponding SAK from a local key store. Furthermore, they can use a PN and SCI from a packet header to reconstruct a 96 bit IV for use by the decryption algorithm. The decryption algorithm can internally regenerate the ICV for the packet and can use it to validate the received ICV as part of the encrypted packet.

To ensure that upstream and downstream engines are in sync with SA metadata (SCI, AN) and the symmetric SAK, which are used to perform confidentiality and integrity validations, a CloudSec control plane (hosted by a site SDN controller and multisite controllers) can distributes SA metadata and the SAKs from upstream to downstream site devices before they can be used by the CloudSec data plane. Also to ensure that an IV is not reused, the upstream site control plane can a perform rekey operations, e.g., a timer based SAK expiration (rekey) before the exhaustion of a PN counter, or a PN counter usage based SAK expiration (rekey) before the exhaustion of a PN counter. The upstream site control plane can redistribute a new symmetric SAK to downstream site engines.

In a scenario involving multiple transmitter engines operating with a single receiver decryption engine within a secure channel, the transmitters working in parallel may potentially use a same PN for packets which may result in IV reuse during the lifetime of a SAK. Multi-point-to-multi-point (M2M) VxLAN tunnels may be used to interconnect datacenter site fabrics over the public internet. The CloudSec technology can be adapted to include a mechanism to secure the traffic traversing over the VxLAN tunnels.

To achieve higher network redundancy and traffic bandwidth scale, the interconnecting VxLAN tunnels use shared any-cast IP addresses to terminate tunnel endpoints on spine devices of the interconnecting sites. The VxLAN tunnel endpoints span across uplinks on the same spine or multiple spines at each end of the tunnel endpoints. This results in VxLAN intersite tunnel traffic flows which can either (i) exit from same spine uplink on the upstream site and can enter from any one of the spine links on the downstream site, or (ii) exit from multiple spine uplinks on the upstream site and can enter from a same spine link on the downstream site.

In an example ACI deployment, each spine uplink interface providing datacenter interconnect hosts a dedicated encryptor and decryption engine, thus creating a scenario where multiple transmitter encryption engines are active and transmitting packets from an upstream site to downstream site decryption engines within a same secure channel. In such a deployment, there is a potential that the multiple encryptors may generate a same PN counter and reuse a same IV, and hence not comply with the AES standards.

Embodiments of this disclosure can provide a method that guarantees a unique per packet IV for security associations. The unique IV can operate with multiple transmitters and multiple receivers, and hence can provide standards compliance for CloudSec technology in multipath scenarios. However, the techniques to generate and use unique IVs disclosed herein are not limited to CloudSec environments and can be applicable to other encryption technologies that may operate in similar deployment scenarios comprising multiple transmitter encryptors and multiple receiver decryptors.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates first example multipath communications between devices of a first datacenter and devices of a second datacenter, in accordance with various aspects of the technologies disclosed herein. FIG. 1 includes an architecture 100 comprising a site 1 fabric 110 which may be included in a first datacenter, and a site 2 fabric 120 which may be included at a second datacenter. Devices of the site 1 fabric 110 and the site 2 fabric 120 can communicate via a site-to-site VxLAN overlay tunnel 130, which can be, e.g., a tunnel traversing the public internet 132.

The datacenter comprising the site 1 fabric 110 can also comprise a site SDN controller 116 and can operate according to control plane settings provided by a multisite controller (MSC) 118. The datacenter comprising the site 2 fabric 120 can also comprise a site SDN controller 126 and can operate according to control plane settings provided by the MSC 118. The MSC 118 can operate across sites via control plane communications 135 which can be separate and distinct from communications via the site-to-site VxLAN overlay tunnel 130.

The site 1 fabric 110 can include a leaf layer 112 and a spine layer 114. The leaf layer 112 can comprise any number of leaf nodes, e.g., L11, L12, L13, L14, L15, and L16. The spine layer 114 can comprise any number of spine nodes, e.g., S11, S12, and S13. Similarly, the site 2 fabric 120 can include a leaf layer 122 and a spine layer 124. The leaf layer 122 can comprise any number of leaf nodes, e.g., L21, L22, L23, L24, L25, and L26. The spine layer 124 can comprise any number of spine nodes, e.g., S21, S22, and S23.

In general, with reference to FIG. 1, the site 1 fabric 110 can encrypt and send communications comprising packets to the site 2 fabric 120 via the site-to-site VxLAN overlay tunnel 130. The site 2 fabric 120 can receive and decrypt the packets.

At the site 1 fabric 110, the leaf nodes L11, L12, L13, L14, L15, and L16 can receive data to be sent to devices, virtual machines (VMs) or other resources at the site 2 fabric 120. The leaf nodes L11, L12, L13, L14, L15, and L16 can provide such data to the spine nodes S11, S12, and S13, and the spine nodes S11, S12, and S13 can encrypt and send the data to the site 2 fabric 120.

At the site 2 fabric 120, the spine nodes, e.g., S21, S22, and S23 can receive encrypted data packets from the spine nodes S11, S12, and S13 of the site 1 fabric 110. The spine nodes, e.g., S21, S22, and S23 can decrypt the encrypted data packets and forward the decrypted data along to the leaf nodes L21, L22, L23, L24, L25, and L26. The leaf nodes L21, L22, L23, L24, L25, and L26 can subsequently forward the decrypted data along to the along to destination computing resources, e.g., to devices, VMs or other resources at the site 2 fabric 120.

The spine nodes S11, S12, and S13 at the site 1 fabric 110 can be configured according to configuration settings determined at the site SDN controller 116. Similarly, the spine nodes S21, S22, and S23 at the site 2 fabric 120 can be configured according to configuration settings determined at the site SDN controller 126. The configuration settings can be communicated and coordinated by the MSC 118.

In the scenario illustrated in FIG. 1, three example traffic flows (Flows 1, 2, 3) are encrypted and sent from the site 1 fabric 110 by spine device S12 via the site-to-site VxLAN overlay tunnel 130. The multipath IP destination of Flow 1 is spine device S21 at site 2 fabric 120, while the destination of Flow 2 is spine device S22 at site 2 fabric 120, and the destination of Flow 3 is spine device S23 at site 2 fabric 120. Therefore, the Flows 1, 2, 3 are associated with different destination devices at the site 2 fabric 120. FIG. 1 therefore presents a first example multipath scenario, in which multiple VxLAN intersite tunnel traffic flows exit from a same spine uplink of an upstream site and can enter from any one of the spine links on the downstream site. Methods described herein can guarantee unique per packet IVs for security associations in environments comprising multiple transmitters and multiple receivers, i.e., in scenarios illustrated in FIG. 1, scenarios illustrated in FIG. 2, and combinations thereof.

Figure 2:
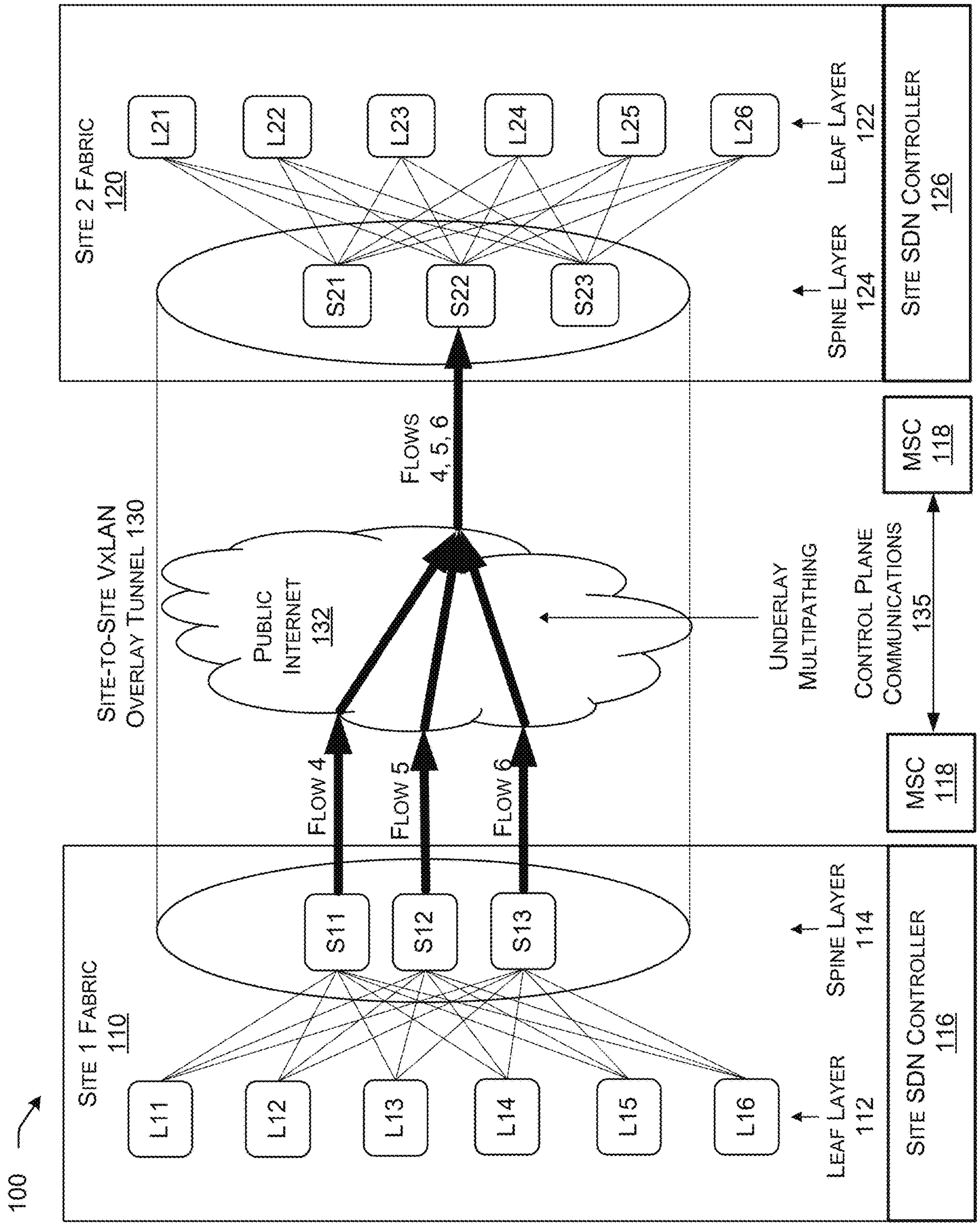
FIG. 2 illustrates second example multipath communications between devices of a first datacenter and devices of a second datacenter, in accordance with various aspects of the technologies disclosed herein.

FIG. 2 illustrates second example multipath communications between devices of a first datacenter and devices of a second datacenter, in accordance with various aspects of the technologies disclosed herein. FIG. 2 includes the architecture 100 comprising the site 1 fabric 110, the site 2 fabric 120, and the site-to-site VxLAN overlay tunnel 130 introduced in FIG. 1.

In the scenario illustrated in FIG. 2, three example traffic flows (Flows 4, 5, 6) are encrypted and sent from the site 1 fabric 110 by spine devices S11, S12, and S13, respectively, via the site-to-site VxLAN overlay tunnel 130. The destination of Flows 4, 5, and 6 is spine device S22 at site 2 fabric 120. Therefore, the Flows 4, 5, and 6 are associated with different originating devices at the site 1 fabric 110, and a same multipath IP destination device S22 at the site 2 fabric 120. FIG. 2 therefore presents a second example multipath scenario, in which multiple VxLAN intersite tunnel traffic flows exit from multiple spine uplinks on the upstream site and can enter from a same spine link on the downstream site. As noted above, methods described herein can guarantee unique per packet IVs for security associations in environments comprising multiple transmitters and multiple receivers, i.e., in scenarios illustrated in FIG. 1, scenarios illustrated in FIG. 2, and combinations thereof.

In examples according to FIG. 1 and FIG. 2, datacenter sites can be comprised of multiple pods, and each pod can comprise a fabric with multiple leaf and multiple spine devices. The leaf layers provide the connectivity to the datacenter servers via front panel ports. Each leaf can also be connected to every spine in the spine layer via fabric ports. The spine layer provides interconnectivity to leaves via its fabric ports. Designated spine devices can provide the datacenter interconnects to remote sites via its uplink interfaces connected to Inter Site Network (ISN) over public Internet using multipoint-to-multipoint VxLAN tunnels. Distinct VxLAN tunnels can be used between pairs of sites to carry intersite traffic.

CloudSec technology environments provide data confidentiality and integrity protection and secure intersite communication by encrypting and integrity protecting traffic flowing inside VxLAN tunnels between sites. A shared security association (secure channel) can be set up between a distinct pair of sites operating with multiple encryptors and multiple decryptors via a CloudSec control plane.

Methods according to this disclosure can allocate, distribute, and utilize per packet level unique IVs for use in connection with securing VxLAN traffic flowing from multiple encryptors to multiple decryptors between peer sites. In some embodiments, each of the spine devices S11, S12, and S13 can include multiple encryptors (also referred to herein as encryption engines), and each of the spine devices S21, S22, and S23 can include multiple decryptors (also referred to herein as decryption engines). Upstream site software, e.g., at the site SDN controller 116, can allocate multiple unique SCIs, one for each uplink encryptor interface which provides the intersite connectivity to the remote sites such as the site 2 fabric 120.

In some embodiments, the following example information can be used to logically encode an SCI, in order to make it globally unique among all upstream site encryptor engines: {UpstreamSiteId:DownstreamSiteId:UpstreamPodId:UpstreamSpineId:Upstream EncryptorId}.

In some embodiments, globally unique SCIs can be encoded by encryption engines in a lower 32 bits of a 64-bit SCI field. In other embodiments, all 64 bits of a 64-bit SCI field can be used to encode a globally unique SCI.

In some embodiments, upstream site software, e.g., at the site SDN controller 116 can be configured to download respective globally unique SCIs to respective encryptor engines at the spines S11, S12, S13, and the upstream site software can also program transmit SA information. Each upstream site encryptor engine can be configured to use its unique SCI and a next PN counter to generate cipher text and an ICV for confidentiality and integrity protection, respectively.

Each upstream site encryptor engine can furthermore be configured to tag its unique SCI and the next PN in a packet header, e.g., in a CloudSec header, of an encrypted packet. Upstream site software can distribute all globally unique SCIs and the SA information (including active ANs and the SAKs) from the upstream site to a corresponding downstream site via control plane communications 135.

Downstream site software, e.g., at the site SDN controller 126, can be configured to download received SCIs and the SA information (AN, SAK, etc.), included in the control plane communications 135, to local decryptor engines on spines S21, S22, S23. The local decryptor engines can receive encrypted traffic from the upstream site encryptors.

In some embodiments, every SCI and the active AN can be mapped to a same SA and symmetric key at downstream site spine decryptor engines. The downstream site decryptors can use a received SCI and a PN from a CloudSec header to decrypt cipher text and regenerate an ICV to validate the received ICV in a packet.

Upstream site software, e.g., at the site SDN controller 116 can be configured to trigger a periodic rekey process, wherein the upstream site software allocates a newer key (SAK), distributes it to the downstream site software to be programmed to remote decryptors, and downloads the same to local encryptors at the spines S11, S12, S13 before a PN counter of any of the encryptors becomes exhausted.

Using a per encryptor based SCI and PN counter for a secure channel operating with multiple encryptors, as described herein, ensures IV uniqueness for every packet that is encrypted in the channel. Embodiments can therefore facilitate compliance with unique per packet IV usage requirements of encryption standards.

Figure 3:
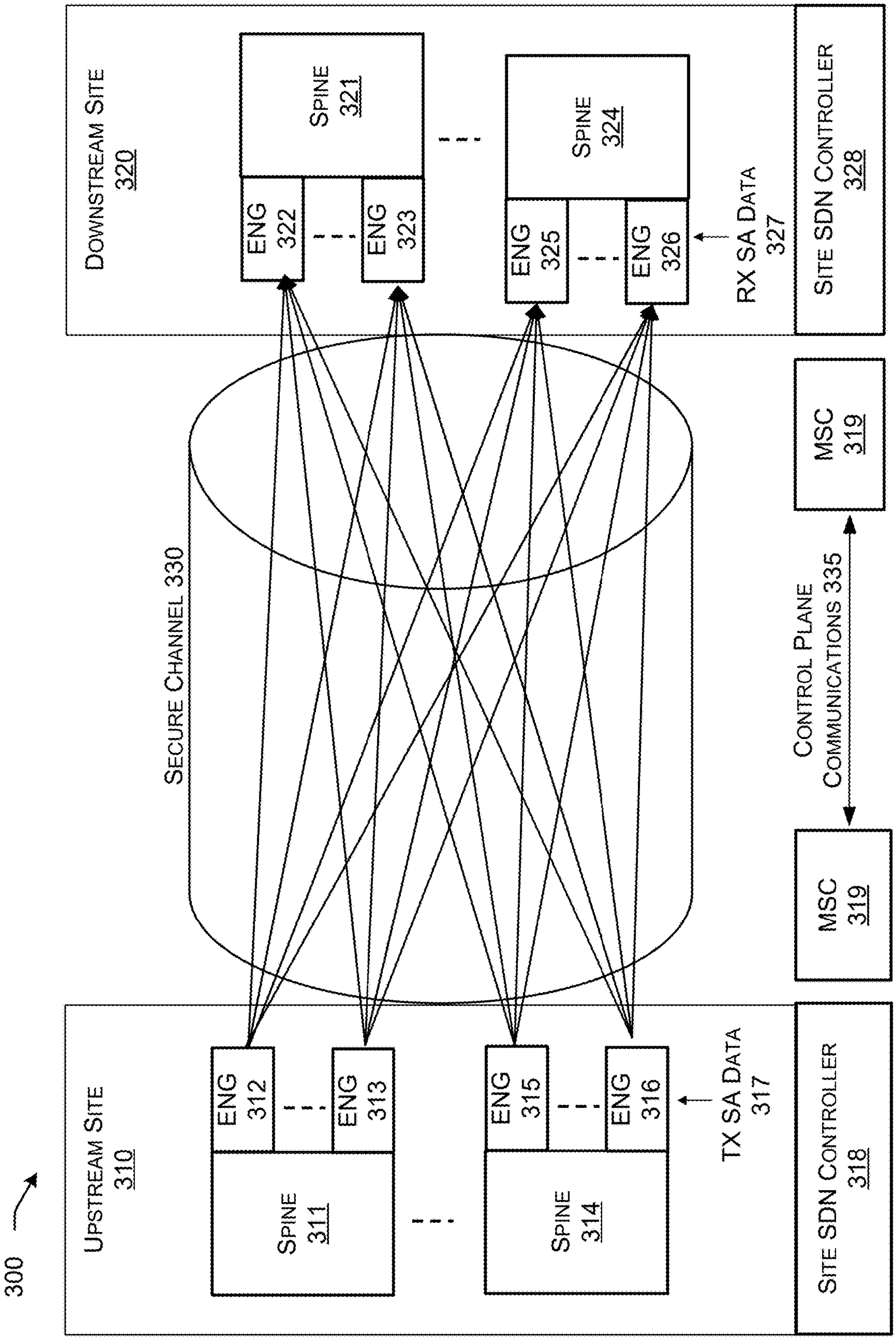
FIG. 3 illustrates third example multipath communications between devices of a first datacenter and devices of a second datacenter, as well as encryption and decryption engines at the datacenters, in accordance with various aspects of the technologies disclosed herein.

FIG. 3 illustrates third example multipath communications between devices of a first datacenter and devices of a second datacenter, as well as encryption and decryption engines at the datacenters, in accordance with various aspects of the technologies disclosed herein. FIG. 3 includes an architecture 300 comprising an upstream site 310, a downstream site 320, a secure channel 330, and control plane communications 335. The upstream site 310 can implement the site 1 fabric 110, the downstream site 320 can implement the site 2 fabric 120, the secure channel 330 can implement the site-to-site VxLAN overlay tunnel 130, and the control plane communications 335 can implement the control plane communications 135, in some embodiments.

The upstream site 310 comprises example spine devices, including spine 311 and spine 314. The upstream site 310 can comprise any number of spine devices. Likewise, the spine devices can include any number of encryption engines. Spine 311 comprises example encryption engines 312 and 313. Spine 314 comprises example encryption engines 315 and 316. The encryption engines 312, 313, 315 and 316 can be configured according to transmit security association (TX SA) data 317, as described herein. The TX SA data 317 can be generated/provided by a site SDN controller 318, and the TX SA data 317 as well as receive security association (RX SA) data 327 can be coordinated between sites via MSC 319. The TX SA Data 317 can include, e.g., a unique SCI, Association Number (AN) and the symmetric key allocated by the upstream site SDN Controller 318 and distributed to the downstream site SDN controller 328 via the MSC 319.

The downstream site 320 comprises also example spine devices, including spine 321 and spine 324. The downstream site 320 can comprise any number of spine devices. Likewise, the spine devices can include any number of decryption engines. Spine 321 comprises example decryption engines 322 and 323. Spine 324 comprises example decryption engines 325 and 326. The decryption engines 322, 323, 325 and 326 can be configured according to RX SA data 327, as described herein. The RX SA data 327 can be generated by an upstream site SDN controller 318 and can be received by a downstream site SDN controller 328. The RX SA data 327 can be distributed to the decryption engines 322, 323, 325 and 326 by the downstream site SDN controller 328. The transmission of RX SA data 327 between sites can be coordinated between sites by the MSC 319.

In an example according to FIG. 3, multipath communications are supported between the upstream site 310 and the downstream site 320. Any of the encryption engines 312, 313, 315 and 316 can use the techniques described herein to encrypt and send packets via the secure channel 330 to any of the decryption engines 322, 323, 325 and 326, and conversely, any of the decryption engines 322, 323, 325 and 326 can use the techniques described herein to receive and decrypt packets sent from any of the encryption engines 312, 313, 315 and 316.

The example illustrated in FIG. 3 includes two example sites, however it should be emphasized that additional sites can be involved, and any of the sites can be an upstream site or a downstream site. The illustration of two sites, designating one site as the upstream site and the other as the downstream site, is helpful to simplify the description herein, however multiple sites connected in a full mesh topology is a more realistic deployment of the techniques described herein.

In general, the techniques applied according to this disclosure can include allocating, at the upstream site 310, respective unique secure channel identifiers (SCIs) to respective uplink encryptor interfaces, i.e., to the encryption engines 312, 313, 315 and 316 that provide intersite connectivity to the downstream site 320. The respective unique SCIs can comprise, inter alia, respective unique upstream encryptor identifiers.

For example, the respective unique SCIs can include the following data: upstream site ID, downstream site ID, upstream pod ID, upstream spine ID, upstream engine ID. The upstream site ID can identify the upstream site 310. The downstream site ID can identify the downstream site 320. The upstream pod ID can identify a pod (not indicated in FIG. 3) which includes, e.g., the spine 311 and the spine 314. The upstream spine ID can identify a spine, e.g., spine 311, to which a unique SCI will be assigned. The upstream engine ID can identify an encryption engine, e.g., encryption engine 312, to which a unique SCI will be assigned.

In some embodiments, generating the respective unique SCIs and allocating respective unique SCIs to respective encryption engines 312, 313, 315 and 316 can be performed by the site SDN controller 318. After the unique SCIs are allocated, they can be used by the encryption engines 312, 313, 315 and 316 to encrypt packets. Each encryption engine 312, 313, 315 or 316 can use its unique SCI, along with a packet number (PN) counter value associated with a packet, to encrypt the packet. Each encryption engine 312, 313, 315 or 316 can furthermore include its unique SCI and the PN counter value in a header of the encrypted packet, and can send the encrypted packet and the header via the secure channel 330 to the downstream site 320.

In some embodiments, encryption keys used by the encryption engines 312, 313, 315 and 316, and corresponding decryption keys for use by the decryption engines 322, 323, 325 and 326, can be generated and optionally repeatedly regenerated in rekey operations performed by the site SDN controller 318. Decryption keys and unique SCIs used by the encryption engines 312, 313, 315 and 316 can be communicated to the downstream site 320 by the MSC 319 via control plane communications 335. The downstream site 320 can receive decryption keys and the unique SCIs, and the MSC 319 can distribute the decryption keys and the unique SCIs to the decryption engines 322, 323, 325 and 326 as RX SA data 327. The MSC 319 can optionally distribute the RX SA data 327 via the site SDN controller 328. At the downstream site 320, each of the unique SCIs can be mapped to a same current SAK.

Furthermore, the SDN controller 318 can repeatedly reset one or more packet number counters used by the encryption engines 312, 313, 315 and 316. For example, when a packet number counter approaches an upper limit for the counter, the SDN controller 318 can reset the counter back to an initial value applicable by the counter. In some embodiments, a rekey process can be performed before the counter is reset, and the counter can be reset as part of a process initiated as a rekey.

Figure 4:
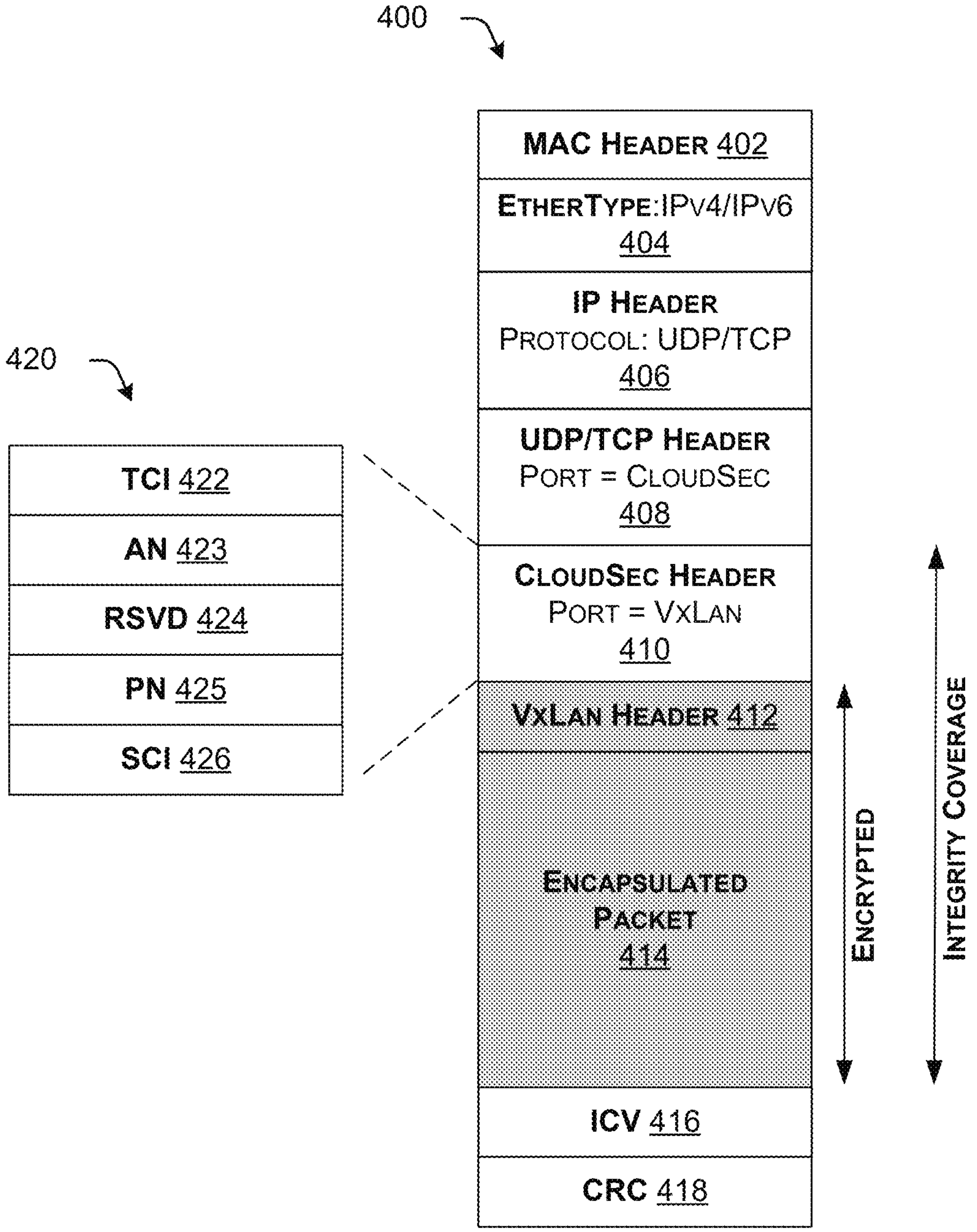
FIG. 4 illustrates an example encrypted packet which can be sent between datacenters, in accordance with various aspects of the technologies disclosed herein.

FIG. 4 illustrates an example encrypted packet which can be sent between datacenters, in accordance with various aspects of the technologies disclosed herein. For example, packets according to the example packet 400 can be generated and sent by the encryption engines 312, 313, 315 and 316 illustrated in FIG. 3 in some embodiments. The example packet 400 includes a MAC header 402, an ether type 404 (e.g., IPv4 or IPv6), an internet protocol (IP) header 406 (e.g., protocol UDP or TCP), a UDP/TCP header 408 (e.g., designating a port=CloudSec), a CloudSec header 410 (e.g., designating a port=VxLAN), a VxLAN header 412, an encapsulated packet 414, an ICV 416, and a CRC 418. The VxLAN header 412 and the encapsulated packet 414 can be encrypted, and integrity coverage of the packet 400 may span the CloudSec header 410, the VxLAN header 412, and the encapsulated packet 414.

In the illustrated embodiment, the CloudSec header 410 can include the information 420, wherein the information 420 can provide a unique initialization vector (IV) for the packet 400. The information 420 can include, e.g., tag control information (TCI) 422, an association number (AN) 423, a reserved segment (RSVD) 424, a packet number (PN) 425, and a secure channel identifier SCI 426.

Figure 5:
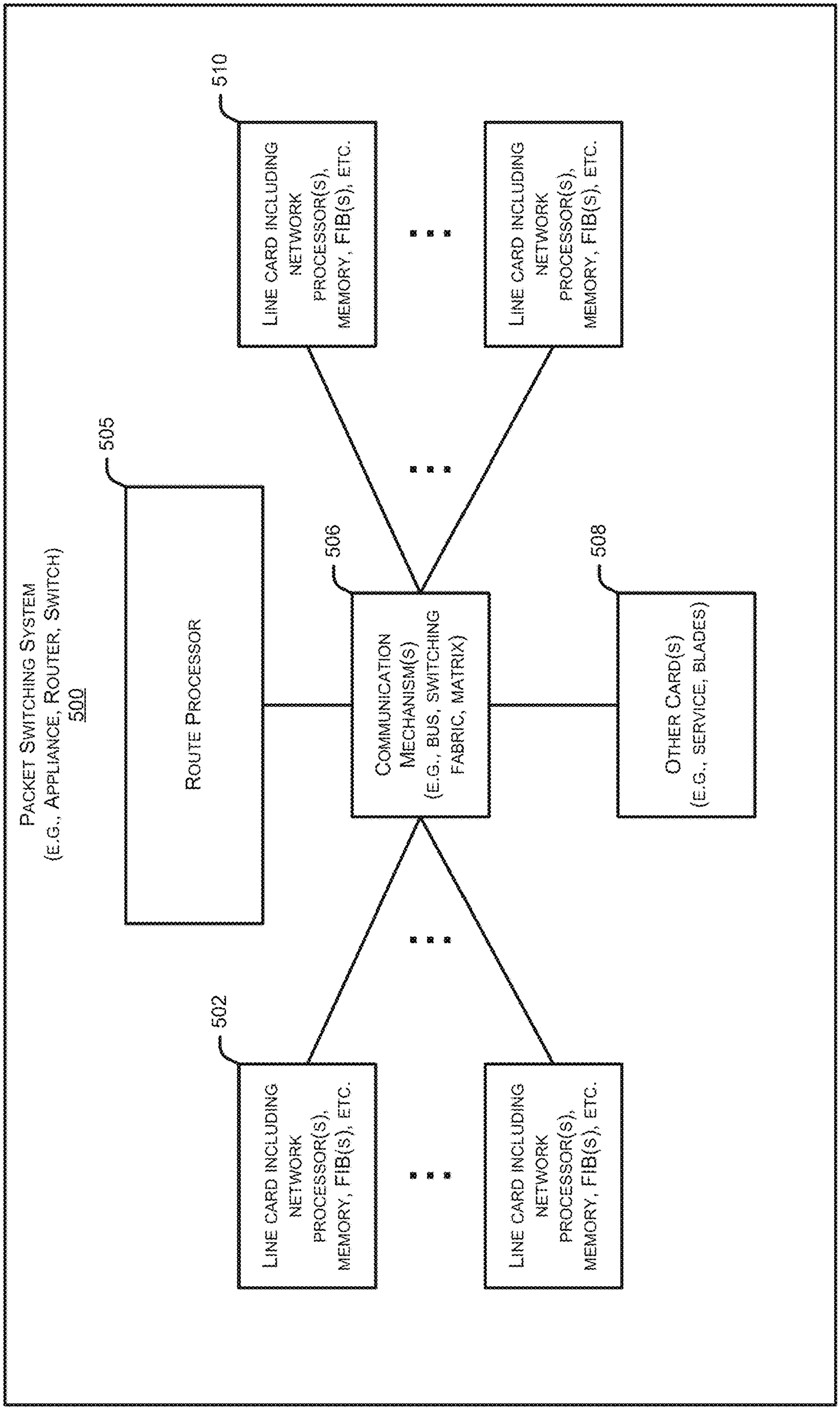
FIG. 5 illustrates an example packet switching system that can be utilized to implement a device at a datacenter, in accordance with various aspects of the technologies disclosed herein.

FIG. 5 illustrates an example packet switching system 500 that can be utilized to implement a router or other access point device, in accordance with various aspects of the technologies disclosed herein. For example, the packet switching system 500 can implement any of the spine nodes or leaf nodes described herein. In some examples, the packet switching system 500 can be implemented as one or more packet switching device(s). The packet switching system 500 may be employed in a network, for example, the packet switching system 500 can implement a router configured to process network traffic by receiving and forwarding packets. The illustrated elements of the packet switching system 500 can include, e.g., components introduced in any of FIGS. 1-3 to configure the packet switching system 500 to perform operations according to this disclosure.

In some examples, the packet switching system 500 may comprise multiple line card(s) 502, 510, each with one or more network interfaces for sending and receiving packets over communications links (e.g., possibly part of a link aggregation group). The packet switching system 500 may also have a control plane with one or more processing elements, e.g., the route processor 504 for managing the control plane and/or control plane processing of packets associated with forwarding of packets in a network. The packet switching system 500 may also include other cards 508 (e.g., service cards, blades) which include processing elements that are used to process (e.g., forward/send, drop, manipulate, change, modify, receive, create, duplicate, apply a service) packets associated with forwarding of packets in a network.

The packet switching system 500 may comprise a communication mechanism 506 (e.g., bus, switching fabric, and/or matrix, etc.) for allowing the different entities such as the multiple line card(s) 502, 510, the route processor 504, and the other cards 508 to communicate. The communication mechanism 506 can optionally be hardware-based. Line card(s) 502, 510 may perform the actions of being both an ingress and/or an egress line card of the line card(s) 502, 510, with regard to multiple packets and/or packet streams being received by, or sent from, the packet switching system 500.

Figure 6:
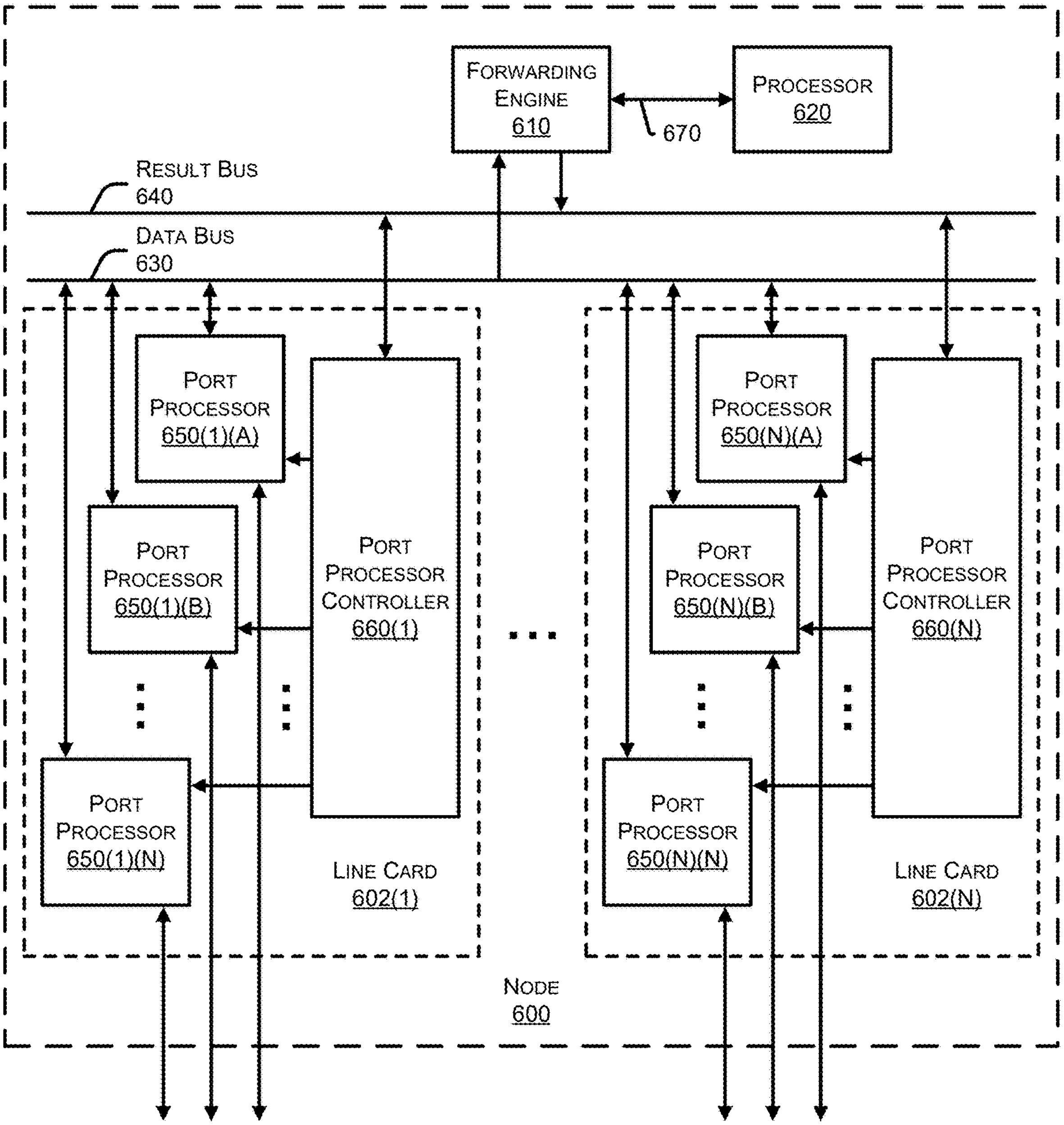
FIG. 6 illustrates an example node that can be utilized to implement a device at a datacenter, in accordance with various aspects of the technologies disclosed herein.

FIG. 6 illustrates an example node that can be utilized to implement a device at a datacenter, in accordance with various aspects of the technologies disclosed herein. For example, the node 600 can implement any of the spine nodes or leaf nodes described herein. In some examples, node 600 may include any number of line cards 602, e.g., line cards 602(1)-(N), where N may be any integer greater than 1, and wherein the line cards 602 are communicatively coupled to a forwarding engine 610 (also referred to herein as an encryption engine) and/or a processor 620 via a data bus 630 and/or a result bus 640.

Line cards 602 may include any number of port processors 650, for example, line card 602(1) comprises port processors 650(1)(A)-650(1)(N), and line card 602(N) comprises port processors 650(N)(A)-650(N)(N). The port processors 650 can be controlled by port processor controllers 660, e.g., port processor controllers 660(1), 660(N), respectively.

Additionally, or alternatively, the forwarding engine 610 and/or the processor 620 can be coupled to one another via the data bus 630 and the result bus 640 and may also be communicatively coupled to one another by a communications link 670. The processors (e.g., the port processor(s) 650 and/or the port processor controller(s) 660) of each line card 602 may optionally be mounted on a single printed circuit board.

When a packet or packet and header are received, the packet or packet and header may be identified and analyzed by the node 600 in the following manner. Upon receipt, a packet (or some or all of its control information) or packet and header may be sent from one of port processor(s) 650 at which the packet or packet and header was received and to one or more of those devices coupled to the data bus 630 (e.g., others of the port processor(s) 650, the forwarding engine 610 and/or the processor 620). Handling of the packet or packet and header may be determined, for example, by the forwarding engine 610.

For example, the forwarding engine 610 may determine that the packet or packet and header should be forwarded to one or more of the other port processors 650. This may be accomplished by indicating to corresponding one(s) of port processor controllers 660 that a copy of the packet or packet and header held in the given one(s) of port processor(s) 650 should be forwarded to the appropriate other one of port processor(s) 650. Additionally, or alternatively, once a packet or packet and header has been identified for processing, the forwarding engine 610, the processor 620, and/or the like may be used to process the packet or packet and header in some manner and/or may add packet security information in order to secure the packet.

On a node 600 sourcing a packet or packet and header, processing may include, for example, encryption of some or all of the packet or packet and header information, the addition of a digital signature, and/or some other information and/or processing capable of securing the packet or packet and header. On a node 600 receiving a packet or packet and header, the processing may be performed to recover or validate the packet or packet and header information that has been secured.

Figure 7:
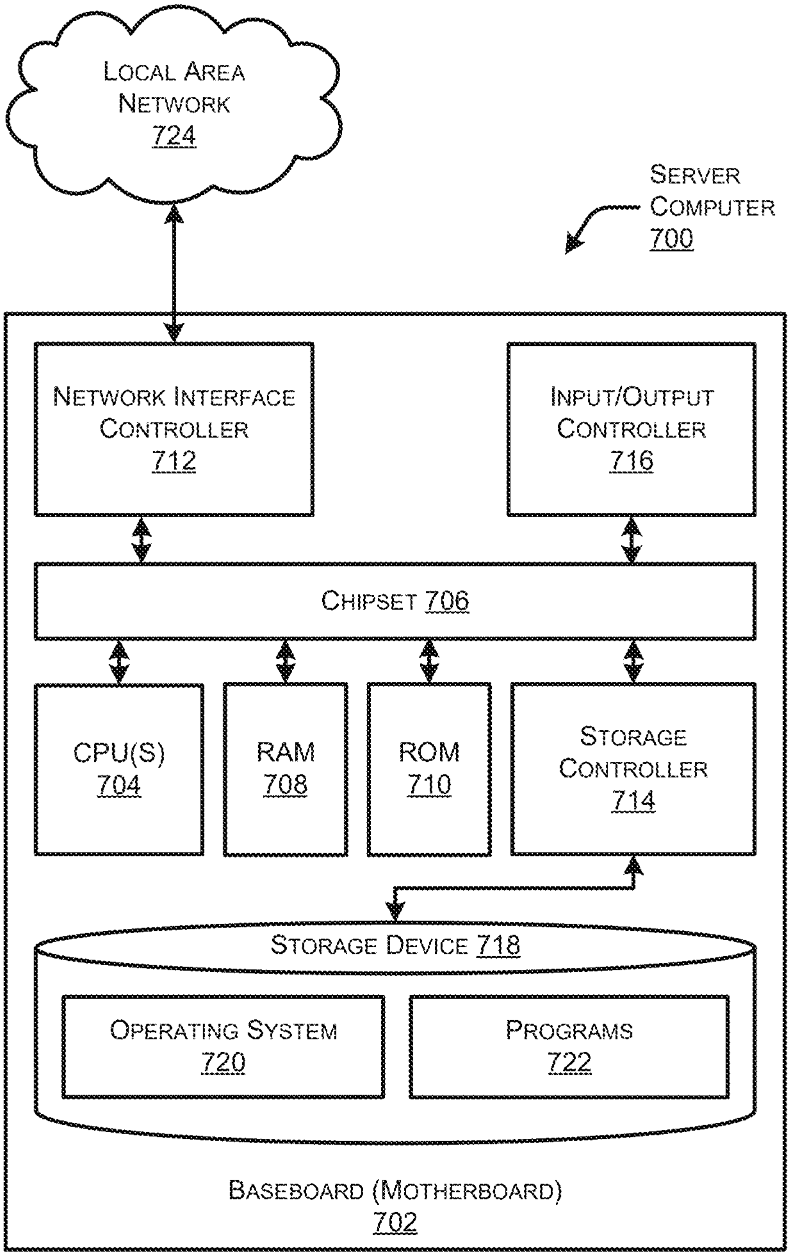
FIG. 7 illustrates an example computer hardware architecture that can implement the controllers disclosed herein, in accordance with various aspects of the technologies disclosed herein.

FIG. 7 illustrates an example computer hardware architecture that can implement the controllers disclosed herein, such as the site SDN controllers and MSCs, in accordance with various aspects of the technologies disclosed herein. The computer architecture shown in FIG. 7 illustrates a conventional server computer 700, however the computer architecture can optionally implement any other computing devices such as a router, a workstation, desktop computer, laptop, tablet, network appliance, e-reader, smartphone, or other computing device. The illustrated computer architecture can be utilized to execute any of the software components presented herein.

The server computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server computer 700. The chipset 706 can further provide an interface to a computer-readable storage medium such as a read-only memory ("ROM") 710 or non-volatile RAM ("NVRAM") for storing basic routines that help to start up the server computer 700 and to transfer information between the various components and devices. The ROM 710 or NVRAM can also store other software components necessary for the operation of the server computer 700 in accordance with the configurations described herein.

The server computer 700 can operate in a networked environment using logical connections to remote computing devices and computer systems through a network, such as the LAN 724. The chipset 706 can include functionality for providing network connectivity through a NIC 712, such as a gigabit Ethernet adapter. The NIC 712 is capable of connecting the server computer 700 to other computing devices over the LAN 724. It should be appreciated that multiple NICs 712 can be present in the server computer 700, connecting the computer to other types of networks and remote computer systems.

The server computer 700 can be connected to a storage device 718 that provides non-volatile storage for the server computer 700. The storage device 718 can store an operating system 720, programs 722, and data, to implement any of the various components described in detail herein.

The storage device 718 can be connected to the server computer 700 through a storage controller 714 connected to the chipset 706. The storage device 718 can comprise one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the server computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 700 can further read information from the storage device 718 by detecting the physical states or characteristics of one or more particular locations within the physical storage units.

In addition to the mass storage device 718 described above, the server computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 700. In some examples, the operations performed by the computing elements illustrated in FIGS. 1-3, and or any components included therein, may be supported by one or more devices similar to server computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the server computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the server computer 700.

In one embodiment, the storage device 718 or other computer-readable storage media is encoded with computer-executable instructions which, when loaded into the server computer 700, transform the computer from a general-purpose computing system into a special-purpose computer capable of implementing the embodiments described herein. These computer-executable instructions transform the server computer 700 by specifying how the CPUs 704 transition between states, as described above.

According to one embodiment, the server computer 700 has access to computer-readable storage media storing computer-executable instructions which, when executed by the server computer 700, can implement the architectures and perform the various processes described with regard to FIGS. 1-3, or FIGS. 8-9. The server computer 700 can also include computer-readable storage media having instructions stored thereupon for performing any of the other computer-implemented operations described herein.

The server computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat panel display, a digital projector, a printer, or other type of output device. It will be appreciated that the server computer 700 might not include all of the components shown in FIG. 7, can include other components that are not explicitly shown in FIG. 7, or might utilize an architecture completely different than that shown in FIG. 7.

Figure 8:
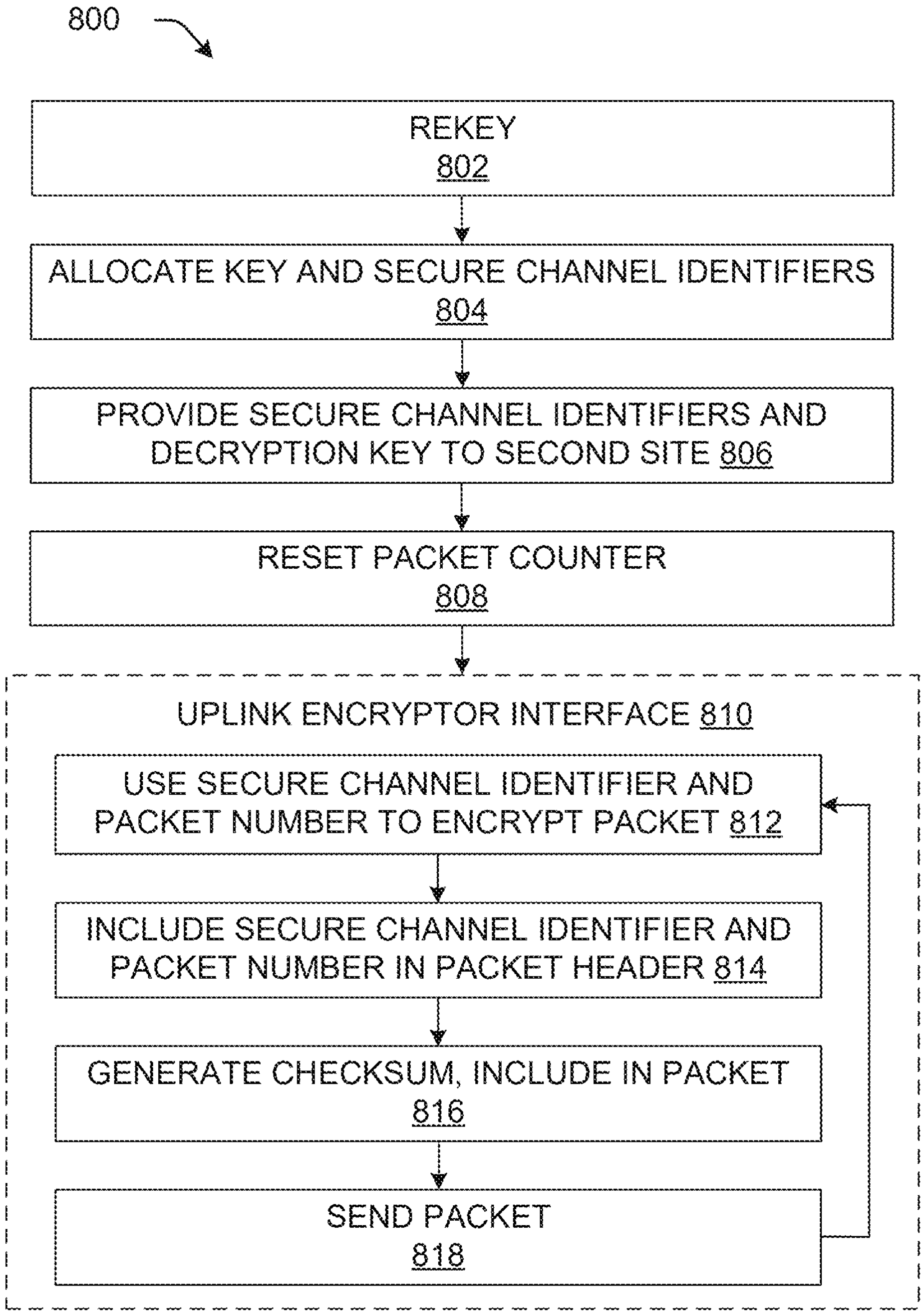
FIG. 8 is a flow diagram that illustrates an example packet encryption method, in accordance with various aspects of the technologies disclosed herein.
Figure 9:
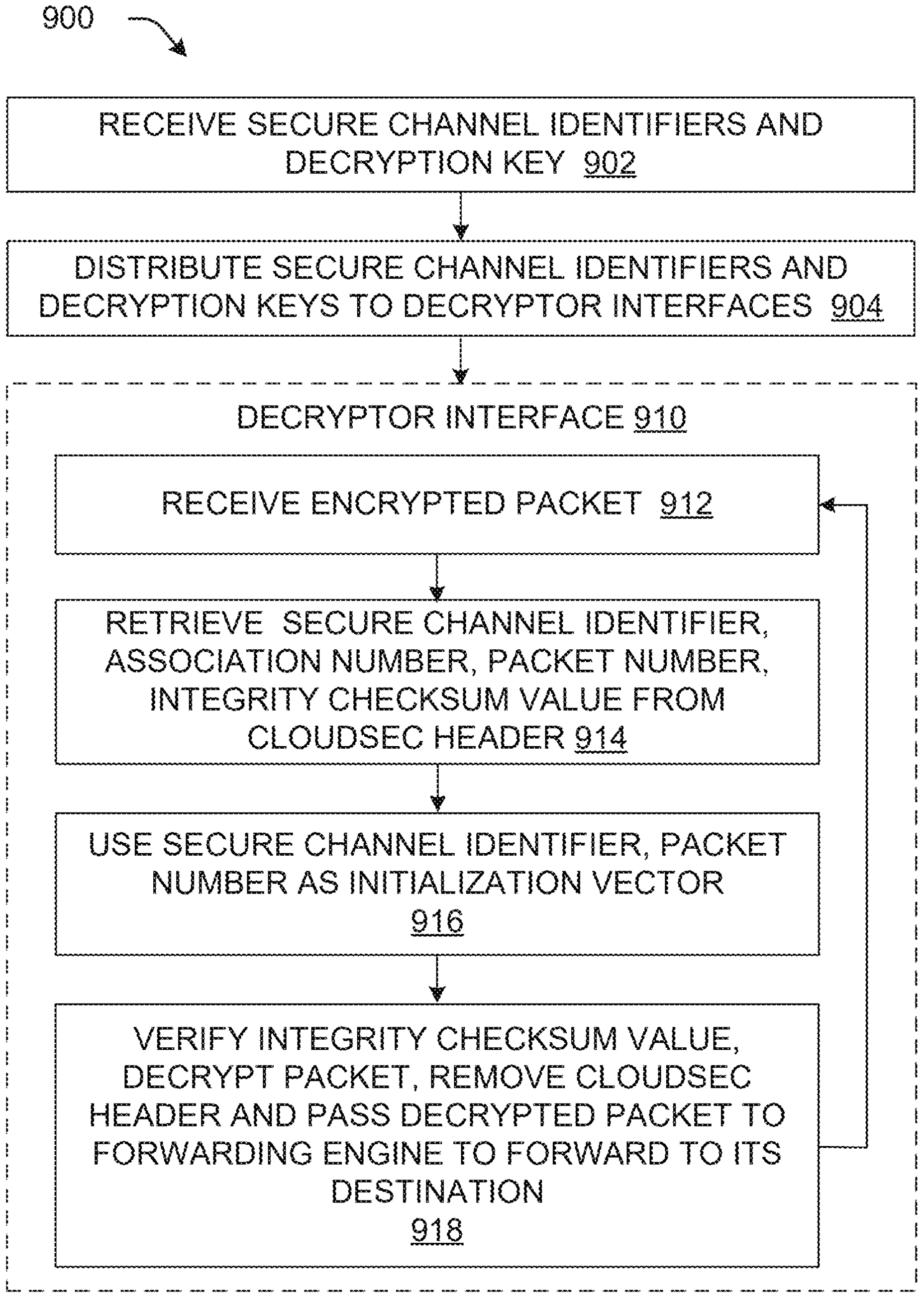
FIG. 9 is a flow diagram that illustrates an example packet decryption method, in accordance with various aspects of the technologies disclosed herein.

FIGS. 8-9 are flow diagrams of example methods 800, 900 performed at least partly by a computing device, such as the server computer 700, optionally in conjunction with other computing devices such as the packet switching system 500 or the node 600. The logical operations described herein with respect to FIGS. 8-9 may be implemented (1) as a sequence of computer-implemented acts or program modules running on a computing system and/or (2) as interconnected machine logic circuits or circuit modules within the computing system. In some examples, the methods 800, 900 may be performed by a system comprising one or more processors and one or more non-transitory computer-readable media storing computer-executable instructions that, when executed by the one or more processors, cause the one or more processors to perform the methods 800, 900.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

It should also be appreciated that more or fewer operations might be performed than shown in FIGS. 8-9 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by fewer components, more components, different components, or any configuration of components.

FIG. 8 is a flow diagram that illustrates an example packet encryption method, in accordance with various aspects of the technologies disclosed herein. In an example embodiment, the illustrated method can be performed at a first datacenter, such as the upstream site 310 illustrated in FIG. 3. Control plane operations, including operations 802, 804, 806, and 808, can be performed by control plane components such as the site SDN controller 318 and the MSC 319, while data plane operations such as packet configuration, encryption and sending can be performed by uplink encryptor interfaces, also referred to herein as encryption engines. Operations of one example uplink encryptor interface 810 are illustrated in FIG. 8, understanding that other uplink encryptor interfaces can perform similar operations in parallel with the uplink encryptor interface 810.

At operation 802, a control plane device or component at the first data center such as the site SDN controller 318 can conduct a rekey, e.g., by generating a new symmetric key including an encryption key for use at the upstream site 310, and a decryption key for use at the downstream site 320. The decryption key can be provided to the downstream site 320, e.g., at operation 806. In some embodiments, rekeying at operation 802 can be performed repeatedly, e.g., at periodic intervals or otherwise.

At operation 804, a control plane device or component at the first data center such as the site SDN controller 318 can allocate, at a first site corresponding to the first datacenter, the encryption key generated at operation 802 as well as respective unique SCIs to respective uplink encryptor interfaces, i.e., to the encryption engines 312, 313, 315, and 316, wherein the respective uplink encryptor interfaces provide intersite connectivity to a second site, namely, the downstream site 320 which may be located at a second datacenter that is geographically remote from the upstream site 310.

The respective unique SCIs allocated at operation 804 can comprise respective unique upstream encryptor identifiers, e.g., a unique engine ID assigned to each of the encryption engines 312, 313, 315, and 316, optionally along with other information such as a first site identifier (associated with the upstream site 310), a second site identifier (associated with the downstream site 320), and an identifier of a respective spine device, e.g., spine 311, comprising a respective uplink encryptor interface, e.g., encryption engine 312, to which a unique SCI is assigned.

At operation 806, a control plane device or component at the first data center can provide respective unique SCIs (that were allocated at operation 804) from the first site (the upstream site 310) to the second site (the downstream site 320) to enable decryption engines 322, 323, 325, 326 at the second site to decrypt encrypted packets. The MSC 319 can furthermore provide any encryption or decryption keys, generated at operation 802, to the downstream site 320.

Operation 808 comprises resetting a packet counter, e.g., resetting a sequence of packet number counter values that is used by the encryptor interface 810 and any other encryptor interfaces at the first site. In some embodiments, a site SDN controller 318 can monitor a packet number counter and can reset the packet number counter when its output values reach a threshold which is approaching a maximum counter value. The threshold may be, e.g., at 95%-99% of the maximum counter value. The operations 812-818 can be repeated by the encryptor interface 810 after operation 808 using packet numbers resulting from the reset at operation 808. When a subsequent rekey operation is needed, e.g., when a packet number counter reaches an upper threshold value, then operation 808 can be repeated. In an embodiment, operations 802-808 can be repeated as a group each time the packet counter is to be reset at operation 808.

Operations 812-818 illustrate operations of one example uplink encryptor interface 810, understanding that other uplink encryptor interfaces can perform similar operations in parallel with the uplink encryptor interface 810. The uplink encryptor interface 810 can correspond, e.g., to the encryption engine 312 illustrated in FIG. 3. At operation 812, the uplink encryptor interface 810 can use the unique SCI allocated thereto, along with a packet number counter value, to encrypt at least a portion of a packet, resulting in an encrypted packet. For example, the encrypted portion of the packet 400 illustrated in FIG. 4 can be encrypted at operation 812. The packet number counter value can comprise, e.g., a next packet number counter value in a sequence of packet number counter values. Encryption can comprise using the unique SCI, the packet number, the encryption key generated at operation 802, and an applicable encryption algorithm, e.g., an AES encryption algorithm, to encrypt the packet.

In some embodiments, operation 812 can further comprise generating a unique packet initialization vector (IV) for the packet. The unique IV can optionally be used to encrypt the packet. At operation 814, the unique SCI and the packet number counter value, optionally in the form of the unique IV, can be inserted into the packet. For example, the information 420 illustrated in FIG. 4 can be inserted into a header field of the packet 400.

At operation 816, the uplink encryptor interface 810 can generate a checksum for the packet and include the checksum in the packet. For example, in some embodiments, the unique SCI allocated to the uplink encryptor interface 810 and the packet number counter value included in the packet can be used generate an integrity checksum value (ICV) such as the ICV 416 illustrated in FIG. 4, and the ICV 416 can be included in the packet 400. As shown in FIG. 4, integrity coverage can span over the CloudSec header 410, which includes the PN 425 and the SCI 426. The PN 425 and the SCI 426 are therefore used to generate the ICV 416.

Operation 818 comprises sending, by the uplink encryptor interface 810, the encrypted packet generated via operations 812-816, including its header, via a tunnel such as the secure channel 330 to the second site, i.e., to the downstream site 320. The tunnel can comprise a VxLAN type tunnel as described herein. Operations 812-818 can be repeated for every packet processed by the uplink encryptor interface 810, using a next available packet number for each packet.

FIG. 9 is a flow diagram that illustrates an example packet decryption method, in accordance with various aspects of the technologies disclosed herein. In an example embodiment, the illustrated method can be performed at a second datacenter, such as the downstream site 320 illustrated in FIG. 3. Control plane operations, including operations 902 and 904, can be performed by control plane components such as the site SDN controller 328 and the MSC 319, while data plane operations such as packet decryption and forwarding can be performed by decryptor interfaces, also referred to herein as decryption engines. Operations of one example decryptor interface 910 are illustrated in FIG. 9, understanding that other decryptor interfaces can perform similar operations in parallel with the decryptor interface 910.

At operation 902, a control plane device or component at the second data center such as the site SDN controller 328 can receive one or more new secure channel identifiers (SCIs) and new decryption keys, optionally generated pursuant to a rekey at the upstream site 310. In some embodiments, receiving information at operation 902 can be performed repeatedly, e.g., at periodic intervals or otherwise.

At operation 904, a control plane device or component at the second data center such as the site SDN controller 328 can distribute the SCIs and decryption keys received at operation 902 to respective decryptor interfaces, i.e., to the decryption engines 322, 323, 325, and 326, wherein the respective decryptor interfaces provide intersite connectivity to the upstream site 310 which may be located at a first datacenter that is geographically remote from the downstream site 320.

The SCIs distributed at operation 904 can comprise respective unique upstream encryptor identifiers, e.g., a unique engine ID assigned to each of the encryption engines 312, 313, 315, and 316, optionally along with other information such as a first site identifier (associated with the upstream site 310), a second site identifier (associated with the downstream site 320), and an identifier of a respective spine device, e.g., spine 311, comprising a respective uplink encryptor interface, e.g., encryption engine 312, to which a unique SCI is assigned.

Operations 912-918 illustrate operations of one example decryptor interface 910, understanding that other decryptor interfaces can perform similar operations in parallel with the uplink decryptor interface 910. The decryptor interface 910 can correspond, e.g., to the decryption engine 322 illustrated in FIG. 3. At operation 912, the decryptor interface 910 can receive an encrypted packet sent by any of the encryption engines, e.g., by the encryption engine 312.

At operation 914, the decryptor interface 910 can retrieve information from a header of the received packet, e.g., from a CloudSec header. The retrieved information can include, e.g., the SCI, AN, PN, and ICV. At operation 916, the decryptor interface 910 can use at least some of the retrieved information, e.g., the SCI and PN, as an IV. At operation 918, the decryptor interface 910 can verify the ICV, decrypt the packet, remove the CloudSec header, and pass the decrypted packet to a forwarding engine to forward it to its destination within the second datacenter.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:

allocating, at a first site, respective unique secure channel identifiers to respective uplink encryptor interfaces, wherein the respective uplink encryptor interfaces provide intersite connectivity to a second site, wherein the respective unique secure channel identifiers comprise respective unique upstream encryptor identifiers;

using, by an uplink encryptor interface of the uplink encryptor interfaces, a unique secure channel identifier allocated to the uplink encryptor interface and a packet number counter value to encrypt at least a portion of a packet, resulting in an encrypted packet;

wherein the packet number counter value used to encrypt at least a portion of the packet is a next packet number counter value in a sequence of packet number counter values, the sequence of packet number counter values resulting from a reset of packet number counter values;

wherein using, by the uplink encryptor interface, the unique secure channel identifier and the packet number counter value to encrypt the at a least a portion of the packet comprises generating a unique packet initialization vector for the packet, the unique packet initialization vector comprising at least three data elements, the at least three data elements including the unique secure channel identifier and the packet number counter value;

including, by the uplink encryptor interface, the unique secure channel identifier and the packet number counter value in a header of the encrypted packet; and sending, by the uplink encryptor interface, the encrypted packet and the header via a tunnel to the second site.

2. The method of claim 1, wherein the tunnel comprises a virtually extensible local area network tunnel.

3. The method of claim 1, wherein the respective unique secure channel identifiers further comprise a first site identifier, a second site identifier, and an identifier of a respective uplink encryptor interface of the respective uplink encryptor interfaces.

4. The method of claim 1, wherein the at least three data elements of the unique packet initialization vector for the packet further include at least one of tag control information and a reserved segment.

5. The method of claim 1, further comprising providing the respective unique secure channel identifiers from the first site to the second site to enable decryptor engines at the second site to decrypt the encrypted packet.

6. The method of claim 1, wherein the packet number counter values were reset prior to the packet number counter values reaching a maximum counter value.

7. The method of claim 1, further comprising using, by the uplink encryptor interface, the unique secure channel identifier allocated to the uplink encryptor interface and the packet number counter value to generate an integrity checksum value and including, by the uplink encryptor interface, the integrity checksum value in the encrypted packet.

8. A device comprising:

one or more processors; and one or more non-transitory computer-readable media storing computer-executable instructions that, when executed by the one or more processors, cause the one or more processors to perform operations comprising:

allocating, at a first site, respective unique secure channel identifiers to respective uplink encryptor interfaces, wherein the respective uplink encryptor interfaces provide intersite connectivity to a second site, wherein the respective unique secure channel identifiers comprise respective unique upstream encryptor identifiers;

using, by an uplink encryptor interface of the uplink encryptor interfaces, a unique secure channel identifier allocated to the uplink encryptor interface and a packet number counter value to encrypt at least a portion of a packet, resulting in an encrypted packet;

wherein the packet number counter value used to encrypt at least a portion of the packet is a next packet number counter value in a sequence of packet number counter values, the sequence of packet number counter values resulting from a reset of packet number counter values;

wherein using, by the uplink encryptor interface, the unique secure channel identifier and the packet number counter value to encrypt the at a least a portion of the packet comprises generating a unique packet initialization vector for the packet, the unique packet initialization vector comprising at least three data elements, the at least three data elements including the unique secure channel identifier and the packet number counter value;

including, by the uplink encryptor interface, the unique secure channel identifier and the packet number counter value in a header of the encrypted packet; and sending, by the uplink encryptor interface, the encrypted packet and the header via a tunnel to the second site.

9. The device of claim 8, wherein the tunnel comprises a virtually extensible local area network tunnel.

10. The device of claim 8, wherein the respective unique secure channel identifiers further comprise a first site identifier, a second site identifier, and an identifier of a respective uplink encryptor interface of the respective uplink encryptor interfaces.

11. The device of claim 8, wherein the at least three data elements of the unique packet initialization vector for the packet further include a reserved segment.

12. The device of claim 8, wherein the operations further comprise providing the respective unique secure channel identifiers from the first site to the second site to enable decryptor engines at the second site to decrypt the encrypted packet.

13. The device of claim 8, wherein the packet number counter values were reset prior to the packet number counter values reaching a maximum counter value.

14. The device of claim 8, wherein the operations further comprise using, by the uplink encryptor interface, the unique secure channel identifier allocated to the uplink encryptor interface and the packet number counter value to generate an integrity checksum value and including, by the uplink encryptor interface, the integrity checksum value in the encrypted packet, wherein the second site is configured to verify the integrity checksum value.

15. A method comprising:

receiving, by an uplink encryptor interface at a first site, a unique secure channel identifier allocated to the uplink encryptor interface, wherein the unique secure channel identifier is one of multiple respective unique secure channel identifiers allocated to respective uplink encryptor interfaces at the first site, and wherein the respective uplink encryptor interfaces provide intersite connectivity to a second site;

using, by the uplink encryptor interface, the unique secure channel identifier and a packet number counter value to encrypt at least a portion of a packet, resulting in an encrypted packet;

wherein the packet number counter value used to encrypt at least a portion of the packet is a next packet number counter value in a sequence of packet number counter values, the sequence of packet number counter values resulting from a reset of packet number counter values;

wherein using, by the uplink encryptor interface, the unique secure channel identifier and the packet number counter value to encrypt the at a least a portion of the packet comprises generating a unique packet initialization vector for the packet, the unique packet initialization vector comprising at least three data elements, the at least three data elements including the unique secure channel identifier and the packet number counter value;

including, by the uplink encryptor interface, the unique secure channel identifier and the packet number counter value in a header of the encrypted packet; and sending, by the uplink encryptor interface, the encrypted packet and the header via a tunnel to the second site.

16. The method of claim 15, wherein the tunnel comprises a virtually extensible local area network tunnel.

17. The method of claim 15, wherein the respective unique secure channel identifiers comprise a first site identifier, a second site identifier, and respective unique upstream encryptor identifiers.

18. The method of claim 15, wherein the at least three data elements of the unique packet initialization vector for the packet further include tag control information.

19. The method of claim 15, wherein the packet number counter values were reset prior to the packet number counter values reaching a maximum counter value.

20. The method of claim 15, further comprising using, by the uplink encryptor interface, the unique secure channel identifier and the packet number counter value to generate an integrity checksum value and including, by the uplink encryptor interface, the integrity checksum value in the encrypted packet, wherein the second site is configured to verify the integrity checksum value.

* * * * *